United States Patent
Habegger

(10) Patent No.: US 7,062,802 B2
(45) Date of Patent: Jun. 20, 2006

(54) MULTIPURPOSE SANITARY INSTALLATION

(76) Inventor: Virgile Habegger, Chemin de Gremaudet 1, 1073 Savigny (CH)

( * ) Notice: Subject to any disclaimer, the term of this patent is extended or adjusted under 35 U.S.C. 154(b) by 0 days.

(21) Appl. No.: 11/103,089

(22) Filed: Apr. 11, 2005

(65) Prior Publication Data

US 2005/0235413 A1 Oct. 27, 2005

Related U.S. Application Data

(63) Continuation of application No. PCT/IB03/04654, filed on Oct. 16, 2003.

(51) Int. Cl.
*A47K 4/00* (2006.01)
*E03C 1/01* (2006.01)

(52) U.S. Cl. .......................................................... 4/662

(58) Field of Classification Search ............ 4/662–665; 52/64, 79.4

See application file for complete search history.

(56) References Cited

U.S. PATENT DOCUMENTS 3,869,732 A 3/1975 Garvey 4,597,114 A * 7/1986 Paterlini ......................... 4/662
4,922,559 A * 5/1990 Wall ............................... 4/662
6,349,430 B1 * 2/2002 Forslund ........................ 4/662

FOREIGN PATENT DOCUMENTS

DE 196 51 451 5/1997
EP 3 365 320 4/1990
FR 1 379 768 11/1964

* cited by examiner

*Primary Examiner*—Tuan Nguyen
(74) *Attorney, Agent, or Firm*—Sturm & Fix LLP

(57) ABSTRACT

The invention concerns a rectangular, in particular square, multipurpose sanitary installation, comprising essentially two separate units, namely a dry toilet unit (A) including essentially a wash basin and a toilet and a rectangular washroom (B). the washroom is delimited by at least two adjacent walls of the installation and by a mobile element perpendicular to one side of the installation and moveable parallel to itself, such that the surface of the washroom (B) may vary and with it the surface of the dry toilet unit (A). A mobile element may be used as water-retaining wall or as bench.

12 Claims, 5 Drawing Sheets

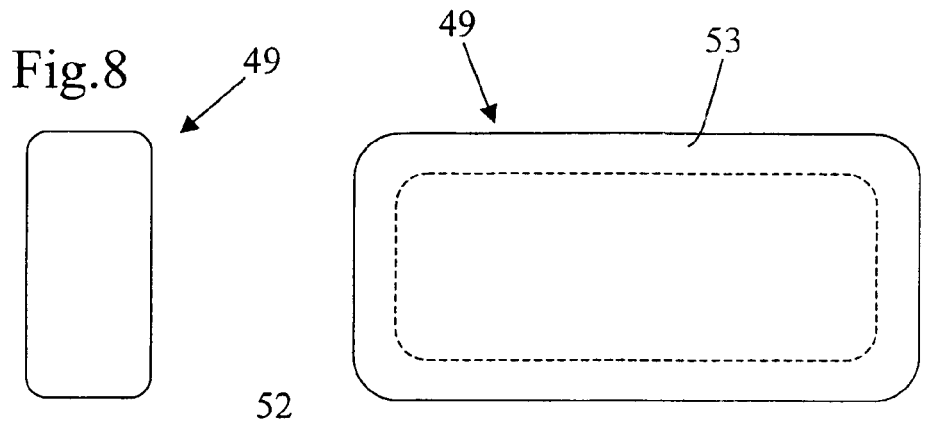
Fig. 8
Fig. 7
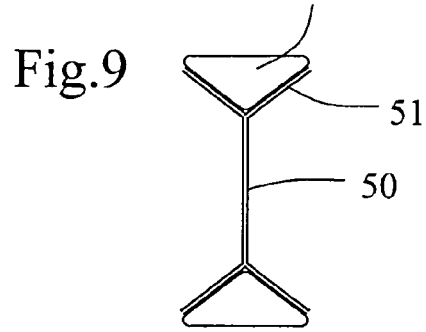
Fig. 9
Fig. 10
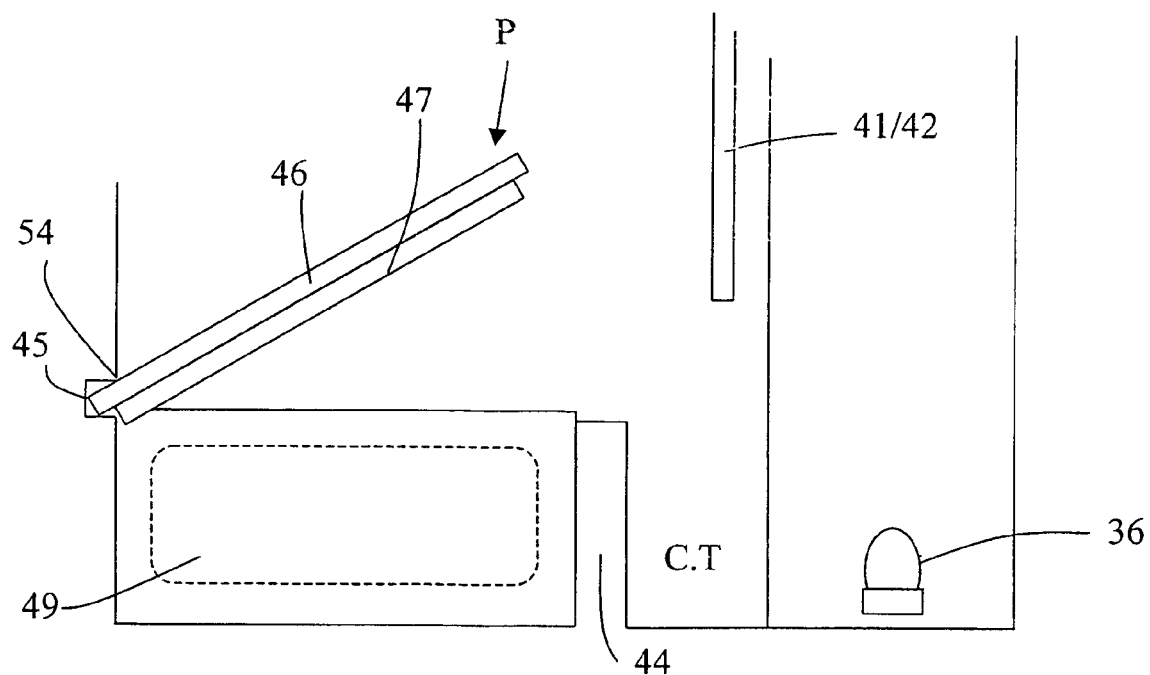

MULTIPURPOSE SANITARY INSTALLATION

CROSS REFERENCE TO RELATED APPLICATIONS

This application is a Continuation of PCT Application No. PCT/IB2003/004654 filed Oct. 16, 2003, claiming priority of French Application No. 02/12917 filed Oct. 17, 2002, which is included in its entirety by reference made hereto.

BACKGROUND OF THE INVENTION

1. Field of the Invention

The subject of the present invention is a rectangular, particularly square multipurpose sanitary facility, comprising essentially two distinct spaces, that is a space for the dry dressing room comprising essentially a washbasin and a WC and a rectangular wet room.

2. Description of the Related Art

From patent FR 1 379 768 a domestic hygiene assembly is known consisting of three distinct enclosures forming respectively a dressing room comprising a washbasin, a wet room comprising a tub-bath and a dressing room comprising a WC, these enclosures being able to be grouped together as desired to form a coherent set in which the wet room is entirely occupied by a circular tub communicating with the dressing room via a door whose threshold is formed by the edge of the tub. In one embodiment, the three enclosures are in a row and the wet room occupies the whole width of the facility. The dressing room or dry dressing room also comprises a rest bed which may also be a medical couch. Each of the enclosures has its own destination and comprises the installation of appropriate sanitary articles, which allows it to be used separately and simultaneously with the other two, without the corresponding users getting in one another's way. The disadvantage of this facility is however, that it occupies an area of approximately 8 m², which was greater than the construction standards in force before the adoption of the standards relating to the needs of handicapped persons.

BRIEF SUMMARY OF THE INVENTION

The essential aim of the invention is to reduce the length of the facility while retaining the dimensions of the wet room provided in the prior art and while offering the possibility of having a dry dressing space sufficiently large to accommodate, in length, a rest bed as provided in the prior art.

This aim is achieved by the multipurpose sanitary facility according to the invention wherein the floor of the wet room is approximately flat and wherein the wet room is delimited, on the one hand, by at least two contiguous walls of the facility and, on the other hand, by a movable element perpendicular to one side of the facility and movable parallel to itself, so that the surface area of the wet room may vary and with it the surface area of the space for the dry dressing room.

The movable element can be moved to the end of the facility so that the surface area of the wet room may vary between practically zero and a maximal determined value.

According to a first embodiment, the wet room is delimited by three contiguous walls of the facility whose walls are, in pairs, of different lengths.

According to one embodiment, the walls of the facility have a cornice and the movable element consists of a partition suspended on the cornice and furnished with means of rolling on this cornice.

The movable partition may also have storage volumes.

According to one embodiment of the invention, the space for the dry dressing room comprises a fixed seat adjacent to the movable partition in a position of maximum surface area of the wet room, this seat being convertible into a rest bed when the movable partition is pushed back to the end of the wet room.

According to embodiments, the sanitary facility according to the invention comprises an auxiliary element that can be used alternatively as a banquette or as a wall for keeping water in the wet room, that is to say as a fourth wall of a bath or of a rectangular splash pool whose three other sides are formed by the walls of the facility.

Since the auxiliary element used as a water retention wall has to provide a seal in its contact with the walls and the floor of the facility, the facility comprises means for pressing the auxiliary element against the floor and against the lateral walls of the facility.

According to one embodiment, the lateral walls of the facility have a console having a bottom face inclined, such that the space between the floor and the console diminishes progressively towards the respective walls, wherein the smallest narrow faces of the auxiliary element, and at least one of its long narrow faces is elastically deformable and that the length and the height of the auxiliary element, free of pressure, are respectively slightly greater than the width of the facility and at the shortest distance between the consoles and the floor, such that when the auxiliary element is in place, it is compressed longitudinally between the walls of the facility and vertically between the consoles and the floor, and the auxiliary element is covered with a sealed elastic padding and it contains its own means of extending its dimensions making it possible to press the auxiliary element against the walls of the facility and against the floor.

According to another embodiment, the facility is square and the wet room is delimited by two walls of the facility and by one internal wall.

Other features of possible embodiments will be evoked during the description of an embodiment of the invention made with reference to the appended drawing.

Thus, as in the prior art, the wet room can be used both for the bath and for the shower and secondarily as a splash pool!

BRIEF DESCRIPTION OF THE DRAWINGS

The appended drawing represents, as examples, two main embodiments of the invention.

FIG. 7 represents a water retention barrier.

FIG. 8 is an end view of this barrier.

FIG. 9 is a view in section thereof.

FIG. 10 is a schematic view, in elevation, of the facility showing the positioning of the retention barrier.

DETAILED DESCRIPTION OF THE INVENTION

Figure 1:
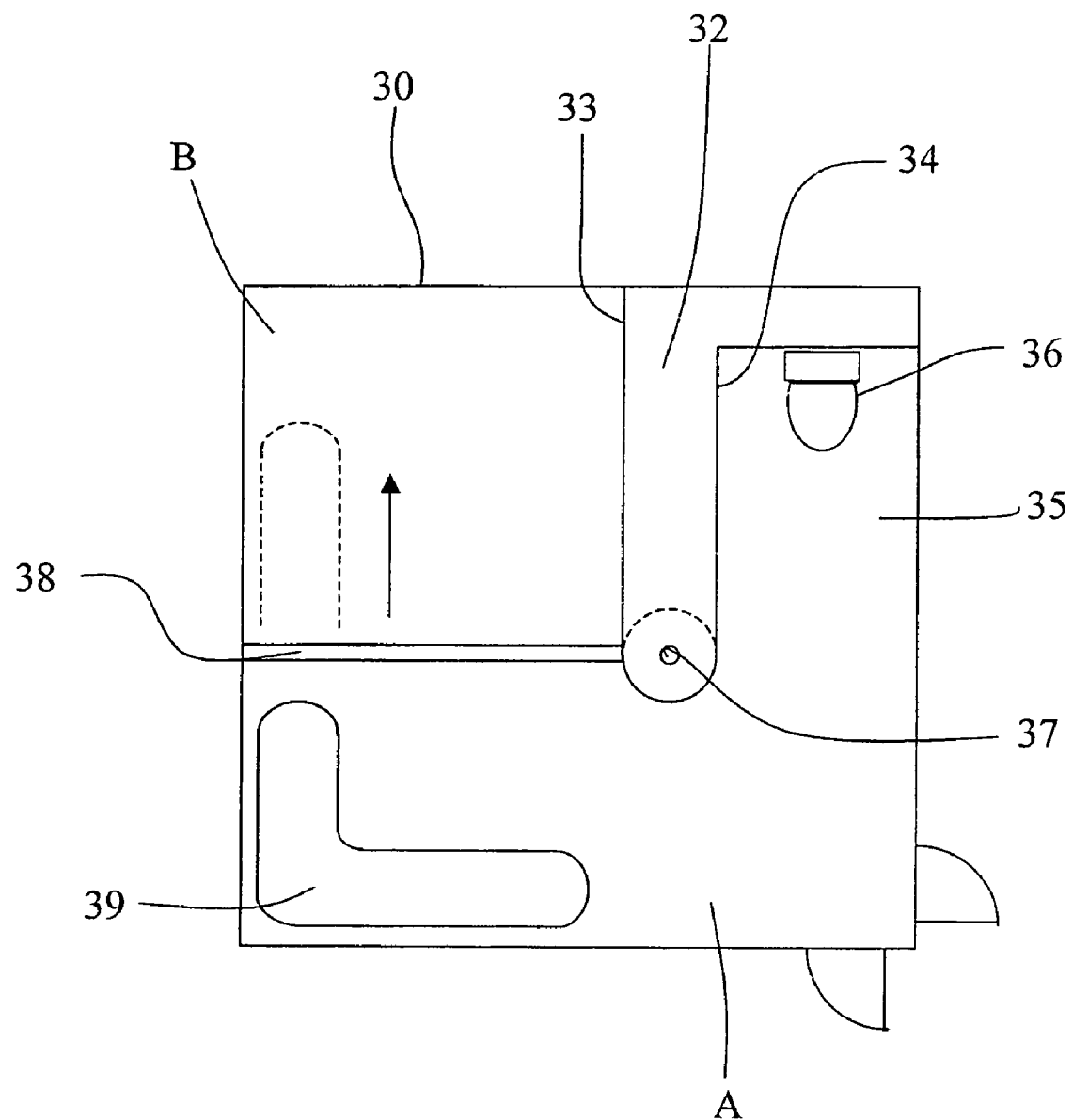
FIG. 1 is a schematic plan view of a second embodiment of the sanitary facility.
Figure 2:
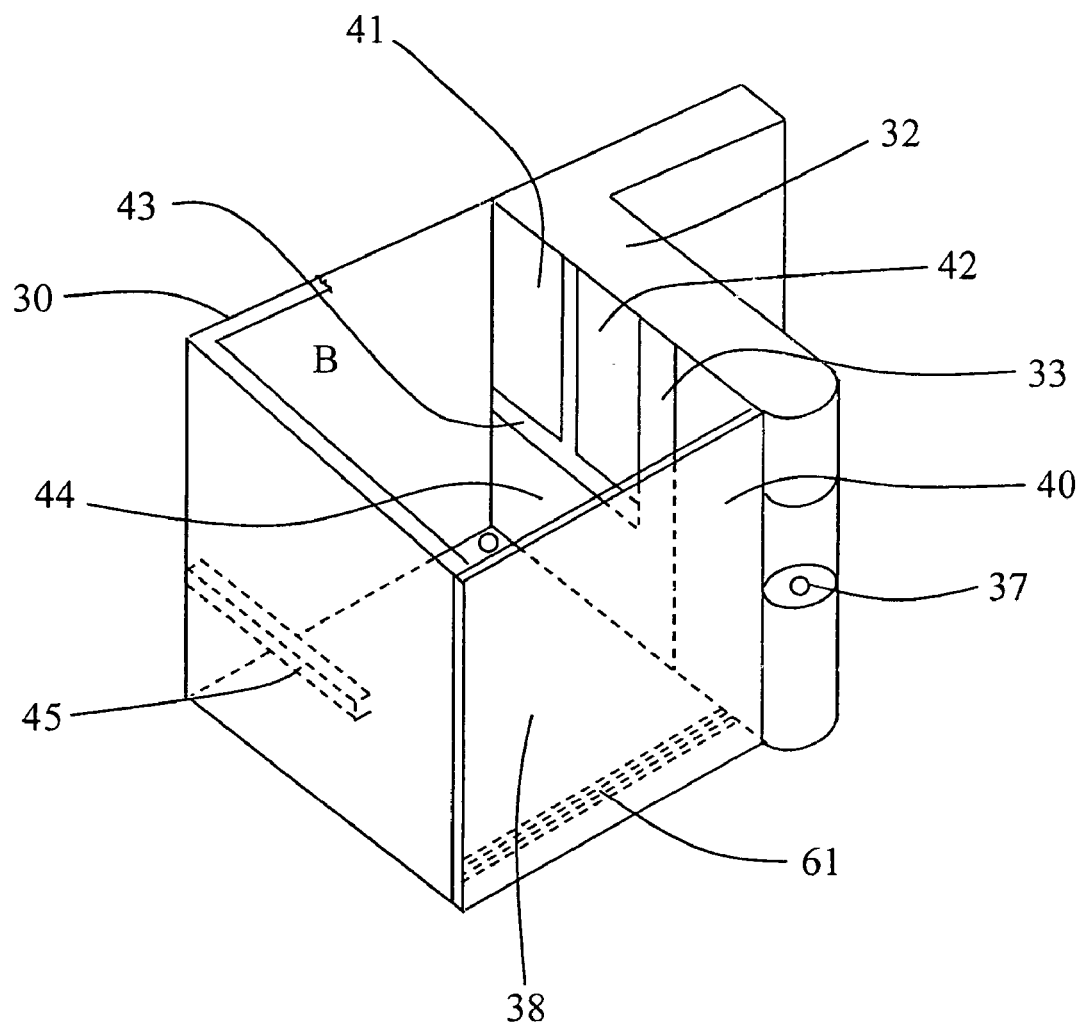
FIG. 2 is a schematic view in perspective of the wet room and of the technical space of the facility according FIG. 1.
Figure 3:
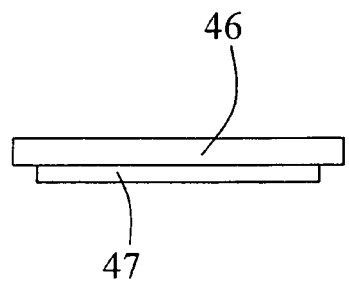
FIG. 3 is a side view of the bench/bath of the second embodiment.
Figure 4:
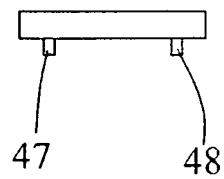
FIG. 4 is an end view of this bench/bath.
Figure 5:
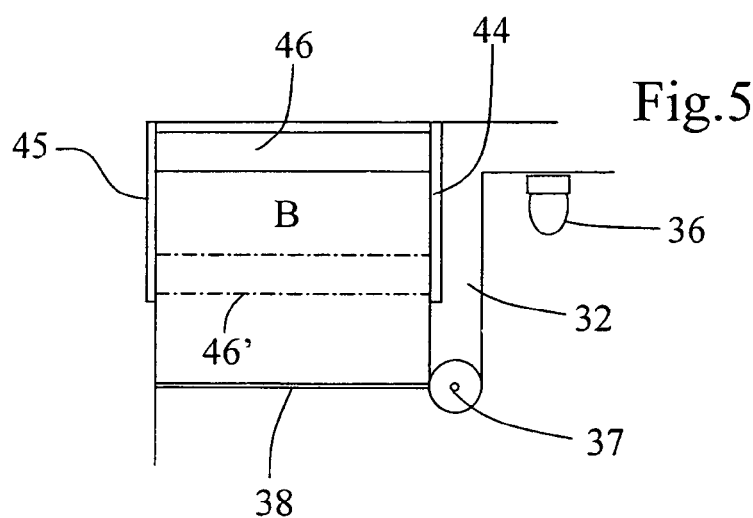
FIG. 5 is a schematic plan view of the wet room fitted with the bench/bath 1.
Figure 6:
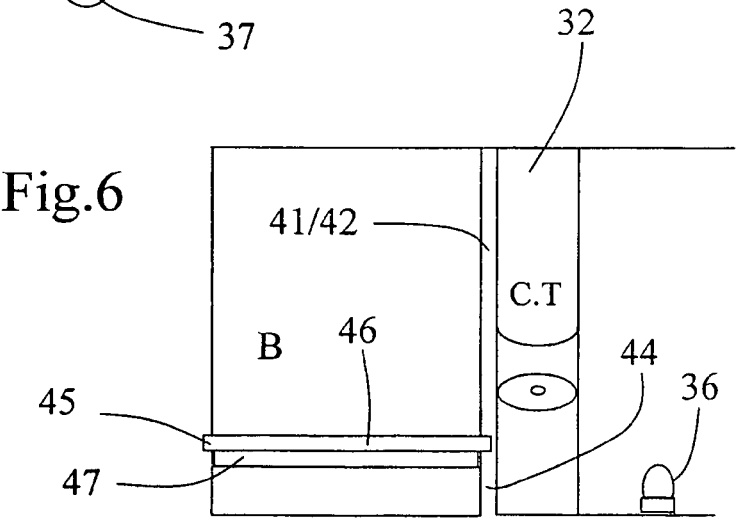
FIG. 6 is a schematic view in elevation thereof.

The facility of the first embodiment is of rectangular shape. It may form a portion of a building or, advantageously, a prefabricated enclosure in rectangular parallelepipedic shape, prefabricated and deliverable fully equipped. This enclosure may be made in any appropriate material.

The enclosure has an entrance that may be closed by a door with two leaves and. Optionally, the enclosure may have two window openings.

The enclosure is divided into two spaces, one space for the dry dressing room A and a wet room B for the bath and the shower. The spaces A and B are separated by a box-shaped partition. The partition can be moved in order to vary the surface areas of the spaces A and B.

The dry dressing room space A comprises an oblique partition delimiting a triangular space in one of the corners of the space A. The space accommodates the technical pipework, pumps, wastewater discharge duct, etc. Perpendicular to the wall a sliding door is installed which interacts with an auxiliary internal wall to close off a subspace A' constituting a WC fitted with a suspended pan. On the other side of the sliding door a washbasin is placed in front of a mirror.

The movable partition is furnished with a central door. One of the sides of the door is subdivided into storage compartments, for the storage of towels and dressing room products. The other side of the door forms a vertical box-shaped element in which a round brush is installed that can be rotated about a vertical axis. Above the door, across the whole width of the movable partition, there extends a box-shaped element containing a rotary round brush.

Along the lateral walls of the wet room B run two consoles at a height of approximately 40 cm above the floor.

As has been mentioned hereinabove, the movable partition may be moved parallel to itself into the wet room so as to reduce the surface area of the latter and to increase the surface area of the space A for dry dressing room. For this purpose, the movable partition is furnished, on each side, in its top portion, with a rolling gear consisting of two rollers, these rollers running in rails formed or fixed in two cornices situated approximately 2 m from the floor. The cornices run almost to the end of the wet room so that the partition may be pushed back to the end of the wet room. The surface area of the wet room therefore varies in practice between the maximal value and zero. The traveling element has recesses for the passage of the consoles.

The facility is also fitted with an auxiliary element whose general shape is a rectangular parallelepipedic panel. This auxiliary element is intended to be used either as a banquette, or as a water retention wall so it will hereinafter be called quite simply a bench-bath. This bench-bath is made of light material so that it can be easily handled by any user. Its ends and at least one of its narrow longitudinal faces is covered with or made of an elastic material, for example rubber, and the bench-bath has a length slightly greater than the distance separating the lateral walls of the facility and a width slightly greater than the height of the consoles measured against the lateral walls of the facility.

When the bench-bath is used as a banquette, it is simply placed flat on the consoles.

When it is used as a water retention partition, it is engaged by a slight rotation about a vertical axis beneath the consoles with its elastically deformable edge on the floor.

The consoles have a bottom face slightly inclined so that the engagement of the bench-bath beneath the consoles has the effect, on the one hand, of vertically compressing the bench-bath and therefore of pressing its elastically deformable face against the floor and, on the other hand, of compressing the bench-bath longitudinally between the opposing walls of the facility. This creates the seal.

If it is planned to use the bench-bath also for delimiting a splash pool, at least one of the large faces of the bench-bath will also be elastically deformable and auxiliary consoles will be provided on the lateral walls of the facility to press the bench-bath, laid flat, against the floor and seal the splash pool.

In embodiment variants, the bench-bath may be fitted with its own means for its axial and transverse extension.

The cylindrical and rotating brushes are used for the automatic washing of the wet room. The horizontal brush cleans the ceiling, the end wall and the floor, plus the lateral walls above the cornices, above its ends. For washing the ceiling, the brush is guided by the rails of the cornices. After having swept the ceiling, the brush is guided to sweep the face on the wet room side of the movable partition and, having reached the floor, it sweeps the floor and the sides of the wet room situated below the consoles.

The vertical brush is used to sweep the vertical walls of the wet room, between the cornices and the consoles. It makes a run there and back to return to its housing in the movable partition. The horizontal brush may of course be used to clean the bench-bath. Various mechanical means may be used to move and guide the brushes, for example telescopic arms or pantographs. The rotation of the brushes is advantageously provided by means of flexible shafts.

The sanitary facility according to the invention may be executed in thousands of more or less sophisticated ways. In its simplest version, the movable partition may be stripped of storage means and brushes. According to a particular variant, the lateral walls of the facility have vertical wall hooks into which the bench-baths are slotted to form a basin and the bench-bath is fitted, at its ends, with retractable pegs furnished with a ramp intended to create the vertical pressure on the bench-bath.

A second embodiment will now be described with reference to FIGS. 1 to 11.

As emerges at first glance from FIG. 1, this embodiment differs essentially from the first embodiment in the square shape of the facility 30 and in that the wet room B occupies only a portion of the sides of the square. In addition, the sliding door, the oblique partition and the triangular space of the first embodiment are advantageously combined into an L-shaped technical space 32 (technical center C.T and storage room), the leg of the L being formed by two parallel walls 33 and 34, the wall 33 limiting the wet room, while the wall 34 delimits a rectangular space 35 in which a WC 36 is placed. A washbasin 37 is advantageously situated at the inner end of the technical space 32. There is a movable partition 38 that can be moved in the direction of the arrow. In front of the washbasin 37, the dry dressing room A is laid out in which is disposed a rest bed 39 mounted on rollers and articulated. The technical space 32 accommodates not only the water, electricity and air conduits and the water and air discharge conduits, but also cleaning means that will be described hereinafter and this space is also used as a cupboard for storing the bench-bath and another auxiliary device that will also be dealt with hereinafter.

All the equipment is thus combined in a compact assembly forming a subassembly capable of being factory built. In addition, the central position of the technical space 32 makes it possible to produce sanitary facilities with variable surface areas by simply modifying the width of the wet room and the width of the dry dressing room. These features increase the installation possibilities of the sanitary facility.

The wall of the technical space 32 has, close to the washbasin 37, a first door 40 extending over the whole height of the wet room. The wall 33 also has two smaller doors 41 and 42 extending from the ceiling over a portion of the height of the wet room, approximately 45 cm above the ground, in order to leave an interstice 43 between the bottom of these doors and the bottom portion of the wall 33, so as to form a kind of low wall 44 extending below the doors 41 and 42. In the wall of the sanitary facility opposite the wall 33 a horizontal groove 45 is formed of rectangular section and whose bottom face is situated at the same level as the top of the low wall 44. This groove and this low wall are intended to support a banquette 46 shown in figures 10 and 11. This banquette 46,is furnished on its bottom face with two parallel battens 47, 48 shorter than the banquette and used, on the one hand, to position the banquette longitudinally between the wall 33 and the opposite wall and, on the other hand, to position the banquette transversely on a water retention element as will be described hereinafter. One of the doors 41 or 42 may be pushed back inside to make it easier to install the banquette 46. The banquette 46 in place is shown in figures 12 and 13. As illustrated in figure 12, the banquette 46 may be moved from one end to the other of the slot 45 and of the low wall 44 to occupy, for example, the position 46'. The dimensions of the banquette are, for example, 160×30×10 cm.

In this embodiment, the banquette 46 cannot immediately be used as a water retention element, but it nevertheless constitutes an essential means thereof. The actual water retention is provided by an auxiliary retention element 49 shown in FIGS. 7, 8, 10 and 11. This water retention element is advantageously designed like a vehicle wheel, that is to say with a rigid portion, for example made of light metal, having a rectangular-shaped core or wheel center 50, whose periphery has a V-shaped profile 51 (FIG. 9), in which an elastically deformable and where necessary compressible packing 52, for example made of rubber, is housed. The profile 51 could also be U-shaped or similar. The assembly shown in FIG. 9 is also overlaid with a sealed cover 53. The retention element 49 has, for example, the following dimensions: length 150 cm, width 20 cm, height 35 cm. In any case, its length is substantially equal to the width of the wet room, and its height markedly greater than the height of the low wall 44 and level with the bottom face of the groove 45.

The installation of the water retention element is illustrated in FIG. 10. The retention element 49 is first erected vertically in the desired location of the wet room, situated between the ends of the groove 45. This installation is carried out with a slight compression of the vertical sides of the retention element 49, that is to say without particular pressure, the slight compression being just sufficient to keep the element 49 in position. The banquette 46 is then inserted obliquely into the groove 45 as shown in FIG. 10, above the retention element 49, so that its battens 47 and 48 are either side of the retention element 49. The banquette 46 is then lowered while exerting a pressure P on its other end. The banquette 46 is thus used as a lever with the top edge 54 of the groove 45 as the fulcrum point. The door 41 or 42 situated opposite the banquette 46 is opened into the technical space. This makes it possible to bring the free end of the banquette 46 onto the low wall 44 and then the corresponding door 41, 42 is closed so that the latter holds the banquette 46 vertically by maintaining the compression exerted by the banquette 46 on the retention element 49. This retention element 49 is thus pressed against the floor and equally against the lateral walls of the wet room by the deformation of the packing 52, thereby sealing the space thus formed.

Figure 11:
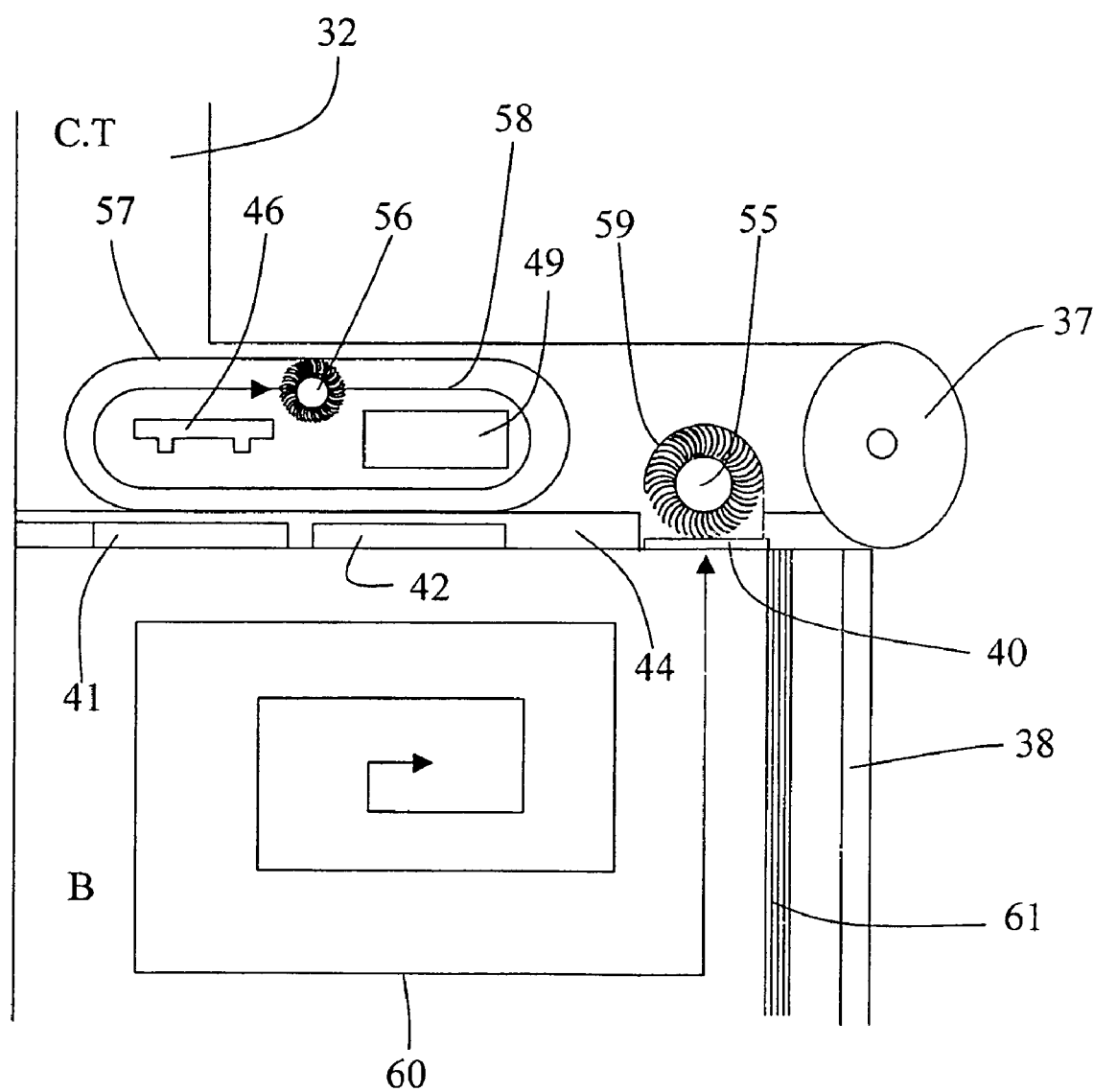
FIG. 11 is a schematic plan view of the cleaning and storage means.

The technical space 32 also serves as a storage space for the banquette 46 and the water retention element 49 and for two rotating cylindrical brushes of vertical axis 55 and 56, as shown in FIG. 11.

The banquette 46 is stored facing the door 41 while the water retention element 49 is stored facing the door 42. The storage locations and the brush 56 are situated in an oval-shaped housing 57 extending from the floor to the ceiling of the facility and used as a collector of overflow water from the bath, and for outflows from the washbasin 37 and the shower. The mechanized brush 56 can be drawn along a rail in a circuit 58 ensuring the cleaning of the housing 57, including walls and ceiling, and simultaneously of the banquette 46 and of the water retention element 49.

The brush 55 is housed at rest in a housing 59 situated just behind the door 40. In use, the brush 55 moves along a rail forming a track 60, approximately in a spiral, inside the wet room, so as to totally clean this wet room, that is to say both the walls, the floor and the ceiling.

The bottom portion of the housing 59 of the brush 55 comprises a basin which the brush 55 also cleans and which is in the path of the water running from a drain grating 61 to the central drain.

The invention claimed is:

1. A multipurpose sanitary facility comprising:
    a substantially flat floor;
    a vertical rear wall (30) operatively attached to the floor, said rear wall having a first end and a second end;
    a vertical front wall operatively attached to the floor, said front wall having a first end and a second end;
    a first vertical sidewall operatively attached to the floor and to the first end of each of the front and rear walls;
    a second vertical sidewall operatively attached to the floor and to the second end of each of the front and rear walls;
    a first interior vertical wall (33) being operatively attached at one end thereof to the rear wall and to the floor, said first interior vertical wall being parallel to said first vertical sidewall, said first interior wall having a second end;
    a second interior vertical wall (34) being operatively attached to the floor and to the second vertical sidewall;
    a moveable interior wall (38) disposed on the floor and parallel to said rear vertical wall, one end thereof being adjacent to said first vertical sidewall and the other end thereof being adjacent to said first interior vertical wall (33), said moveable vertical wall (38) having at least a first position spaced a first distance from the rear vertical wall (30) and a second position spaced a second distance from said rear vertical wall whereby the size of a wet room (B) is defined by the rear wall (30), the first vertical sidewall, the first interior wall (33) and the moveable interior wall (38), said size of the wet room being variable depending upon the position of the moveable interior wall (38); and
    a space above the floor between the first vertical sidewall, the second vertical sidewall and the front wall and the moveable interior wall (38) comprising a dry dressing room (A) of variable size, depending upon the position of the moveable interior wall (38), said dry dressing room (A) having a water closet (WC) and a washbasin (37) therein.

2. The multipurpose sanitary facility of claim 1 wherein the first position of the moveable wall (38) is in juxtaposition to the rear vertical wall and the second position of the moveable wall (38) is adjacent the second end of the first interior wall.

3. The multipurpose sanitary facility of claim 2 wherein there are multiple other positions of the moveable interior wall (38) between the first and second positions thereof.

4. The multipurpose sanitary facility of claim 1 further comprising:
   a water retention element (49) disposed inside the wet room (B), said water retention element (49) having one end sealingly disposed against the first vertical wall, another end scalingly disposed against the first interior wall (33), a bottom sealingly disposed against the floor and a top that is disposed lower than said first interior wall (33); and
   banquette means (45, 46, 47, 48) for selectively holding the water retention element (49) in sealed contact with the floor, first vertical wall and first interior wall in the wet room.

5. The multipurpose sanitary facility of claim 4 wherein the banquette means comprises:
   a horizontal groove (45) on an inside portion of the first vertical sidewall;
   a member (46) having a first end, a second end, a top and a bottom;
   one end of the member (46) being slideably disposed in the horizontal groove; and
   means (41, 42) operatively attached to the interior wall (33) for selectively holding the other end of the member (46) with a downward force against the retention element (49) to maintain sealing relationship between the retention element (49) and the floor (38).

6. The multipurpose sanitary facility of claim 1, further comprising:
   brushing means for brushing portions of the floor, the vertical rear wall (30), the first interior vertical wall (33) and the interior moveable wall (38) that are in the wet room.

7. The multipurpose sanitary facility of claim 6 wherein the brushing means further comprises a track on the floor of the wet room and a rotary brush operatively attached to the track whereby the brush will be guided for movement along the track.

8. The multipurpose sanitary facility of claim 7 further including a storage room defined by the floor and vertical walls, said storage room being adjacent to the wet room for storing the water retention member (49) and the banquette means (46) and a second brushing means disposed in the storage room for selectively brushing the vertical walls and the floor inside the storage room.

9. The multipurpose sanitary facility of claim 7 having a drainage grate (61) disposed in the floor of the wet room.

10. The multipurpose sanitary facility of claim 4, wherein the water retention element has a periphery which is compressible so that when the water retention element is pressed against the floor and the walls of the wet room by the banquette means a water tight seal is formed.

11. The multipurpose sanitary facility of claim 4, wherein the water retention element consists of a rigid core whose periphery has a groove therein, in which an elastically deformable packing is held.

12. The multipurpose sanitary facility of claim 11, wherein the groove is V-shaped.

* * * * *